United States Patent [19]
Muramatsu et al.

[11] Patent Number: 5,580,500
[45] Date of Patent: Dec. 3, 1996

[54] METHOD OF MANUFACTURING CARBON SUBSTRATE

[75] Inventors: Kazuo Muramatsu; Manabu Hisada; Hideki Yamamuro; Hideo Ashida; Satoru Takada; Masami Takao; Yoshihiro Hara; Nobuhiro Ota, all of Kobe, Japan

[73] Assignee: Kabushiki Kaisha Kobe Seiko Sho, Kobe, Japan

[21] Appl. No.: 297,811

[22] Filed: Aug. 30, 1994

[30] Foreign Application Priority Data

| Aug. 30, 1993 | [JP] | Japan | 5-214547 |
| Aug. 30, 1993 | [JP] | Japan | 5-214588 |
| Aug. 30, 1993 | [JP] | Japan | 5-238883 |
| Sep. 2, 1993 | [JP] | Japan | 5-242038 |
| Sep. 2, 1993 | [JP] | Japan | 5-242039 |

[51] Int. Cl.$^6$ .................................................. C01B 31/00
[52] U.S. Cl. .................................................. 264/29.1
[58] Field of Search .................................. 264/29.1, 29.6, 264/29.7

[56] References Cited

U.S. PATENT DOCUMENTS 4,221,773  9/1980  Tsukagoshi et al. ............... 423/445

*Primary Examiner*—Christopher A. Fiorilla
*Attorney, Agent, or Firm*—Oblon, Spivak, McClelland, Maier & Neustadt, P.C.

[57] ABSTRACT

A carbon substrate manufacturing method includes a hot molding step, a burn-carbonizing step, a hot isostatical pressure treatment step, and a mirror polishing step. In the hot molding step, molding is performed while heating thermosetting resin powders to be a hard carbon substrate after burn-carbonizing, where the thermosetting resin powders are of a particle size 150 μm or more, HPF 80–150 mm, a moisture content 1.0–3.0 weight %, Fe, Ni, Si and Ca respectively 5 ppm or less. In the burn-carbonizing process, a disk shaped resin molded body is filled into a graphite cylinder and burn-carbonized by heating from the external while the condition therefor is maintained in that the disk shaped resin molded body is stacked holding therein a graphite spacer at every one sheet basis or at every plurality of sheet basis and is loaded on its top with a tungsten carbide weight, where the graphite spacer has a heat conductivity 100 kcal/m.hr.° C. or less, a bulk density 1.70–1.85, and a flatness degree 10 μm or less.

17 Claims, 11 Drawing Sheets

( SCALING FACTOR : 50 )

(SCALING FACTOR : 50)

(SCALING FACTOR : 50)

(SCALING FACTOR: 75)

(SCALING FACTOR: 75)

5,580,500

METHOD OF MANUFACTURING CARBON SUBSTRATE

BACKGROUND OF THE INVENTION

I. FIELD OF THE INVENTION

This invention relates to a method of manufacturing carbon substrates suitable for substrates of magnetic disks, magnetic heads, optical lens molds, optical reflectors, LSI package and photosensor drums and the like.

II. DESCRIPTION OF THE PRIOR ART

A method of manufacturing carbon substrates as is used in this field is to hot mold and burn resin powders, then with or without hot isostatical pressure treatment to polish substrate surfaces and to produce mirror-finishing surfaces. The well known method for such hot molding process, specifically, proceeds to fill powders of phenol-formaldehyde resin into a die, to apply a pressure 100 to 200 kgf/cm$^2$ (for example, 150 kgf/cm$^2$), and to mold during 30 to 60 minutes (for example, 45 minutes) at a temperature of 150° to 170° C. (for example, 160° C.) (see Japanese Patent Application Laid open No. Sho-62-234232 in 1987).

However in the conventional hot molding method for the carbon substrates of these kinds, void or pore generated on molding comes to substrate defect after completion of the carbon burning or the surface polishing. Further in those conventional methods, a good amount of gas generates to require a long time for molding, and thereby disadvantageously results in a higher production cost. On filling the powders into the die, hardening begins from a portion in contact with the mold surface due to a high temperature of the mold; this always starts to harden the initially inserted powders, and degrades uniformity of the molded body. Such ununiform molding causes defects of the substrates, requires much time for cleaning the die with a trouble some of complicated handing, and provides difficulty in the continuous molding process.

In the substrates for the magnetic disks which are essentially frequently used in the carbon substrates, strong demands are directed to improvement of surface precision and reduction of surface defects depending on rapid development of recent magnetic disk devices and realization of a high dense recording of the magnetic disks. Amorphous carbon material exhibits property of graphite dispersed into matrix of amorphous carbon. To polish the carbon substrate for mirror finishing, a partially concentrated removal by polishing is performed, such removed portion being of graphite as a core, a largeness of the cavity portion sometimes is larger than a diameter of graphite portion. As described in problem, the conventional method has a possibility to enlarge the defect and to increase the number of defects per unit area as a magnetic disk substrate.

The conventional method of polishing and mirror finishing the carbon substrate, which is capable of eliminating such increase of the number of defects, is to use a tin wheel, and to one-side lap the carbon substrate by aqueous solution in which diamond abrasive grain is dispersed. With this method employed, it is possible that a largeness of void generated on the substrate surface is made substantially equal to a diameter of graphite.

However, the conventional method which uses the tin wheel and one-side laps the carbon substrate by aqueous solution in which the diamond abrasive grain is dispersed, may not be preferable because it requires an extremely high cost for the abrasive grain and therefore requires further a higher operation cost when employing such mirror finishing method for a mass production system. In problem, the method, which is difficult to produce a larger capacity and scale, hardly realizes a larger amount of treatment at the limited time.

Polishing by etching-liquid is widely utilized because the amount of treated alternated layers is reduced by etching-effect, and improves polishing efficiency. For example, alkaline solution such as NaOH and KOH, which is used in polishing the silicon wafer, obtains an efficiency by several times the efficiency of the mechanical polishing (see KIKAI SINKOU KYOUKAI GIJUTU KENKYUUSHO, 0.5 Lapping and Polishing 55/75" in "Machining Technique Data Book").

Since carbon is an extremely stable substance with a high chemical-resistance, the amorphous carbon substrate does not exhibit any etching effect even in using the conventional mechanochemical polishing solution.

In the conventional method of burn-carbonizing the carbon substrate, thermosetting resin molded in a doughnut shape is burned in an inert gas atmosphere at a temperature of about 1000° C. to be carbonized (see the Japanese Patent Application Laid open Number Sho-60-35333 in 1985 and Number Sho-62-23423 in 1987).

However, the thermosetting resin is contracted by about 20% by burn-carbonizing. This provides deformation of the molded body on such burning process, and generates a larger warping. The warping is normally removed at a certain extent by polishing. However, the recent development of the high-dense recording magnetic disk requires an extremely high-polished surface and a graded flatness degree, therefore, for a high dense recording carbon substrate, it is difficult to practically use such carbon substrate as manufactured by the conventional method. In burning process, if a jig to be used contains metallic impurities, these impurity elements are dispersed into materials during burn-carbonizing. In this manner, contaminated material is surface polished so that the contaminated portion comes to substrate defects such as pitting holes etc.

On the other hand, resin molded bodies after burn-carbonizing, which are in lamination each other inserted spacers between each resin molded body, are subjected to a hot isostatical pressure treatment (HIP treatment) to produce a high density thereof. The HIP treatment contracts the resin molded body by about 5%, and raises a material density up to about 1.55 to 1.8.

However, the contraction during the HIP treatment deforms the material and a large warping tends to arise in the obtained carbon substrate. The warping can be removed up to a certain extent by polishing, however, since the recent high-dense recording magnetic disk requires an extremely flat surface, therefore, it is difficult to practically use such carbon substrate.

If the jig used on HIP treatment contains the metallic impurities, these impurity elements are dispersed into the resin molded bodies during the burn-carbonizing. This results in a cause of the substrate defect.

SUMMARY OF THE INVENTION

An object of the present invention is to provide a manufacturing method of a carbon substrate capable of easily shortening molding time and simplifying molding work with restriction of substrate defect.

Another object of the invention is to provide a method of mirror finishing a carbon substrate capable of polishing the carbon substrate with high efficiency and with lower cost together with a larger amount of treatment using a normally used two-side polishing machine utilizing alumina abrasive grain, which is extremely inexpensive compared to diamond abrasive grain.

Further, another object of the invention is to provide a manufacturing method of a carbon substrate suitable for substrates of a high dense recording magnetic disk or the like with a high flatness degree and with restriction of warping.

Still another object of the invention is to provide a manufacturing method of a carbon substrate capable of preventing substrate defect and utilizing as a carbon substrate of a high dense recording magnetic disk by eliminating warping in the carbon substrate.

A method of manufacturing a carbon substrate according to the present invention comprising the steps of; hot-molding thermosetting resin powders to be a hard carbon substrate after burn-carbonizing, the thermosetting resin powders being of a particle size of 150 μm or more and a HPF of 80 to 150 mm and a moisture content 1.0 to 3.0 weight % and Fe, Ni, Si and Ca each of 5 ppm or less; burning a molded body obtained by said hot-molding step to carbonize said molded body; and mirror-polishing a burned body obtained by said burning step.

In this way, according to the invention, by suitably regulating properties including particle size of thermosetting resin material, HPF, moisture content, and metallic element content and the like, generation of a grain boundary and void or pore on molding is prevented, and a substrate without defect can be manufactured. Thereby the present invention is to provide an extremely advantageous carbon substrate for magnetic disks and photosensor drums and the like.

DETAILED DESCRIPTION OF THE PREFERRED EMBODIMENTS

Figure 1:
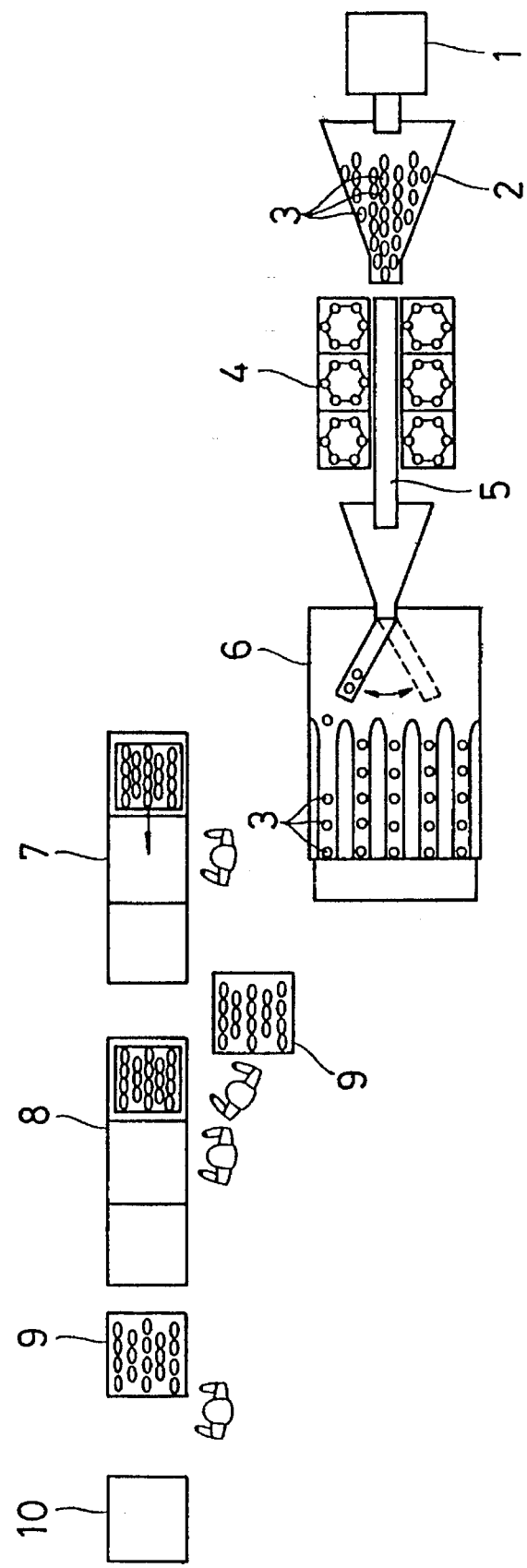
FIG. 1 is a schematic view showing a first embodiment of the present invention.

The present invention will be described in more detail as the following.

A manufacturing method of a carbon substrate according to the present invention, is characterized by utilizing, as a material, thermosetting resin powders with a particle size 150 μm or more, HPF 80 to 150 mm, a moisture content 1.0 to 3.0 weight %, and Fe, Ni, Si and Ca respectively 5 ppm or less.

Where, HPF represents a parameter designating an extent of hardening of resin called as resin disk flow (Hot Pressing Flow), in which the extent of hardening is expressed by resin flow on hot pressing 2 g resin under the condition of a thrust force of 1.145 kg at a temperature of 160° C. with a holding time 60 seconds.

The present inventors of the application have researched and experimented as to a cause to generate the substrate defect after burn-carbonizing. As a result of such study, it has been found that the void or pore on molding and metallic impurities in resin both act as catalyst to produce graphite. For this reason, generation of the graphite is restricted by reducing metallic impurities in the material to be used, in particular, by reducing the amounts of Si, Fe, Ni and Ca.

By optimizing the particle size and the hardening extent of the material and the moisture content in resin, occurrence of void on molding can extremely be reduced.

A particle size of material formed of the thermosetting resin powders is equal to or more than 150 μm. A material particle size less than 150 μm requires a high pressure and a long pressure-holding time on preparing a tablet, a continuous production comes difficult with a higher manufacturing cost. A smaller particle size makes handling difficult and a production efficiency lower. For this reason, the particle size of the material powders is made equal to or more than 150 μm.

When HPF is less than 80, there results insufficient melting on molding, grain boundary on the molded body and defect on the substrate. When HPF exceeds 150, void or pore generates and this results in the substrate defect. Hence, HPF is made as 80 to 150 μm.

With moisture content less than 1.0 weight %, a tablet with a stable shape and weight is not obtained because the tablet can not maintain the shape in the manufacturing step. With the moisture content exceeding 3.0 weight %, a slight void or pore remains in the molded body with a vast amount of gas generation on molding. Therefore in this case, a moisture content of the material is made 1.0 to 3.0 weight %.

The hot molding process is adapted to comprise the steps of molding into a tablet shape at an ordinary temperature the resin powders to be a hard carbon material after burn-carbonizing, preheating and drying the thus obtained tablet, and hot pressure molding the tablet after preheating.

This hot molding process is to first pressurize the thermosetting resin powders at an ordinary temperature, and after cold molding into a tablet shape, to preheat it. Thus, the present invention is capable of processing dehydration and hardening reaction while the situation therefor maintains avoiding the conventional arrangement that resin powders are inserted into a high temperature mold and a portion in contact with such high temperature mold is firstly hardened. Consequently, the present invention secures a uniformity of the tablet and avoids generation of that substrate defect.

Further in the hot molding process, molding of the tablet is performed under a cold pressure condition; thereafter the tablet is preheated and subjected to dehydration and some hardening reaction, and then molded into a carbon substrate shape by hot press molding, therefore the entire processing time is considerably shortened.

Furthermore, the tablet shape may preferably be in T/D =0.2 to 0.4 where D represents a diameter and T represents a thickness thereof. A high-frequency heating is performed in a higher efficiency with thicker thickness of the tablet. Thus, with T/D being less than 0.2, such too thin tablet gives no preheating-effect. On the other hand, with T/D exceeding 0.4, the tablet is too thick, and only a center portion of the tablet melts and proceeds to hardening, but to the contrary a surface of the tablet is not hardened. Thus, an ununiform tablet is molded.

Moreover, another modified example of a hot molding process is adapted to comprise the steps of filling into the die the resin powders which will become hardened carbon material after burn-carbonizing, hot-press molding into a disk shape the resin which has filled in the die, and cutting out a carbon substrate of a predetermined product shape from thus obtained molded body.

In the present invention, the resin powders, which have been filled into the die, are hot-press molded. Accordingly, the resin powders are prevented from hardening because of an ordinary temperature die when filling the resin powders therein, and also an ununiformity of the molded body is prevented.

In the present invention, after inserting the resin powders into the die, the resin powders are directly hot-press molded and not tablet molded, and then a specified production form is cut out from molded product after hot-press molding. Therefore, the manufacturing time is considerably reduced with the simplified process compared to the conventional example. This results in reduced manufacturing cost.

For a method of polishing and mirror finishing a carbon substrate according to the invention, on the other hand, in the method of mirror finishing the carbon substrate for polishing the carbon substrate made of carbon material using water, alumina abrasive grain and a polishing assistant, the alumina abrasive grain is dispersed into a polishing liquid containing water and the polishing assistant by the amount equal to or less than 10 weight %, and the polishing assistant is a water soluble inorganic material constituting an aluminum salt with an oxidation group which are selected from a group of bichromate acid group, nitric acid group, and chlorine group in water.

In this case, for the alumina abrasive grain there may be selected from ground alumina series abrasive grain with an average particle size equal to or less than 2 μm, hexagon plate shaped alumina series abrasive grain with an average particle size equal to or less than 5 μm, and fine particle alumina abrasive grain with an average particle size equal to or less than 1 μm.

In the present invention, in the mirror finish polishing of the surface using water and alumina abrasive grain as a basic polishing material, for the polishing liquid assistant there is used water soluble inorganic material constituting an aluminum salt with an oxidation group which are selected from the group of bichromate acid group, nitric acid group, and chlorine group in water. Particularly, the alumina abrasive grain as polishing material is not required to be used as free abrasive grain dispersed into aqueous solution of the polishing assistant, for example, when such material is converted into and used as an abrasive stone such as liquid bonded abrasive stone, aqueous solution containing the polishing assistant may preferably be used together therewith as a coolant.

The present inventors execute various research and study as to the method of mirror finish polishing in an industrial scale with respect to the carbon substrate made of carbon material. As a result of those, for mirror finishing the carbon substrate made of the carbon material, under the condition of co-existence of the water soluble inorganic material constituting oxidation group and aluminum salt which are selected from the group of bichromate acid group, nitric acid group, or chlorine group, mirror polishing using the alumina polishing fine powders produces a considerably graded quality of polished surfaces compared to the case where no abrasive assistant is used, and it is further found that polishing speed and grinding speed are considerably upgraded.

A polishing mechanism in the present invention is, although not clear, estimated as in the following. The alumina fine powders are, in general, a compound widely used as oxidation catalyst. On the other hand, acid having oxidation such as nitric acid and hydrochloric acid is also frequently widely used in a salt state as an oxidizer. A surface to be polished is polished or ground using alumina as polishing fine powders to produce a high pressure due to concentrated weight and a high temperature due to friction heating. In this way, the alumina fine powders which have obtained an active point, so-called-mechanochemical polish by chemically and mechanically polishing or grinding carbon made of carbon material being reduction substance. When using as a polishing assistant the water soluble inorganic material constituting oxidation group and aluminum salt which are selected from the group of bichromate acid group, nitric acid group, or chlorine group, then compared to the case where no such is used, a polishing speed is rapidly improved and the substrate surface shape and property such as surface roughness and the number of defects and the like are considerably improved. Tis polishing process is followed by chemical action which is apparent from the fact of heating by polishing or grinding. In addition, in view of hardly affected by concentration of the polishing assistant in aqueous solution, it is estimated that coexistence of water restricts a radical reaction to form a suitable polishing state.

On the other hand, the carbon material applied in the present invention is in a state, for example, where graphite is dispersed into matrix of amorphous carbon. When unsuitably polishing the carbon substrate for mirror finishing, a partially concentrated removal with such part containing graphite as a core is performed and results in more enlarging the cavity portion than the graphite diameter. Specifically, this increases a largeness of the defect and the number of defects per unit area as a magnetic disk substrate. It is possible that a manufacturing stage of the carbon proceeds to make into fine particles the graphite deposited depending on the manufacturing condition, and from among them to regulate the number of deposited graphite having relatively larger particle sizes. However, complete elimination of the depositing of the graphite is extremely difficult. Thus, it is sometimes required to define the various conditions for mirror finishing depending on a characteristic of the carbon material to be an object and a necessary specification of the products.

For example, the defect generation of alumina polishing fine powders to be used decreases with the finer size of its particle, but the time required for processing such polishing increases with finer size of the same, which designates a reciprocal relationship therebetween. To restrict a manufacturing cost, this requires an optimum condition corresponding to the required product quality. The optimum processing condition depends on the nature of the alumina to be used, even if the particle sizes of the alumina polishing fine powders are the same.

For example, in a method of mirror finishing by a free abrasive grain system, in case of using WCA (white color plate shaped aluminum quality polishing material) abrasive grain which is a hexagon plate shaped aluminum series abrasive grain in stead of WA (white aluminum quality polishing material) abrasive grain which is one of crushed alumina series abrasive grain, then a diameter value of an upper limit particle required for obtaining the same quality comes large. It is estimated that an effective portion of polishing of WA abrasive grain is a point, in contrast to this, a polishing effective portion of WCA abrasive grain is line or plane, and therefore when regulating depending on a thickness of the abrasive grain on polishing, the particle size of the WCA abrasive grain is excessively evaluated.

For a polishing pad, the increase of defects is more restricted with more hardness of the polishing pad attached on a polishing wheel. For this reason, a full hard pad having a hardness of 60 or more as a polishing pad may preferably be attached.

To secure an effect rate of chemical polishing for defect reducing, as alumina abrasive grain there may be used an average particle size of 2 μm or less, and for using the WA abrasive grain, an average particle size of 5 μm or less for the hexagon plate shaped alumina series abrasive grain, and an average particle size of 1 μm or less for the fine particle alumina series abrasive grain. Those alumina abrasive grains are allowed to have a concentration of 10 weight % or less on dispersion into the polishing liquid.

From these phenomena, it is estimated that the increase of defects is restricted with the raised value of the effect rate of the chemical polishing in mechanochemical polishing. Particularly, when using λ alumina series abrasive grain, various factors such as a particle size, a hardness, and a crystal characteristic are considered to combine each other, thereby the number of defects can be reduced down to the number which the substrate itself intrinsically possesses.

A method of burn-carbonizing the carbon substrate according to the present invention will be described hereunder. The method of burn-carbonizing the carbon substrate proceeds to fill the graphite cylinder and to heat from the external, thereby the burn-carbonizing is achieved while the condition therefor is maintained in that disk shaped resin molded bodies are stacked embracing a graphite spacer at every one sheet basis or at every plurality of sheet basis, and a tungsten carbide weight is loaded on top of the resin molded body, where the graphite spacer is of a heat conductivity of 100 kcal/m.hr.° C. or less having an bulk density of 1.70 to 1.85 with a flatness degree of 10 μm or less.

A warp generation of material on burn-carbonizing is because a good amount of gas ($H_2O$, CO, $CO_2$, $CH_4$, $H_2$) from resin generates during burning and a contraction of size by an extent of 20% is produced. The warping is not generated if the contraction is produced uniformly in the material, but practically, a temperature difference arises in the diameter direction and the plate thickness direction of the material, to introduce the contraction difference, which comes to a residual stress and produces the warping. In particular, an inside of a burning furnace is directly affected by a heater, a portion adjacent to the heater produces a large warping.

In the present invention, the resin molded body is incorporated in a graphite cylinder, which is heated from the external and the inside of resin molded body is thus heated. In this arrangement, a wall of the graphite cylinder relaxes a direct heating of a heating means such as a heater or the like, which minimizes an influence of the direct heating by the heater. Especially, graphite has a higher heat-conductivity in a direction along its surface but a lower heat-conductivity in a thickness direction. Thus, an unevenness of heating existing in the heating means such as a heater can be made uniform in a direction along the surface of the graphite cylinder.

To more suppress generation of the warping, the resin molded bodies are stacked each other embracing the graphite spacer at every one sheet basis or at every plurality of sheet basis, and burned in a state of being loaded of a weight. Furthermore, the tungsten carbide (WC) weight is loaded on top of the stacked body, thus the burning is performed under the condition of being weighed.

The graphite spacer has a heat conductivity of 100 kcal/m.hr.° C. or less with an bulk density of 1.70 to 1.85. When the heat conductivity exceeds 100 kcal/m.hr.° C, then because of too high heat conductivity, the heating of the material surface in contact with the spacer surface is promoted of heating, thereby to the contrary the flatness degree is deteriorated.

If a flatness degree of the spacer itself is degraded, the warping of the spacer is transferred to the material, then to prevent such, the graphite spacer is required 10 μm or less for a flatness degree ranging from an outer edge to an outer edge. This flatness degree designates a height difference between a highest position and a lowest position.

The graphite spacer and graphite cylinder are in contact with the material to be molded, then if metallic impurity exists in the graphite spacer and graphite cylinder, these metal elements are dispersed into the material during burn-carbonizing, this comes to a cause of such substrate defects. For this reason, ash, Fe, Ti, and V in the graphite constituting these members may preferably highly be purified as ash: 100 ppm or less, Fe: 10 ppm or less, Ti: 5 ppm or less and V: 5 ppm or less respectively. This considerably reduces generation of the substrate defects.

In the present invention, a hot isostatical pressure heating treatment process may preferably be provided between a burning process and a polishing process. The hot isostatical pressure heating treatment is to laminate resin molded body of after burn-carbonizing in a hole provided in a graphite jig, to load a carbon end plate thereon, to load further on its highest position a tantalum carbide weight, and in such loaded state, the hot isostatical pressure treatment is performed.

In the present invention, for example, a graphite jig having a plurality of holes is used, and by filling in its holes 10 to 200 sheets of stacked resin molded bodies after burn-carbonizing, the stacked body of the resin molded bodies is contained in the graphite jig, where a pair of amorphous carbon end plates are arranged in manner of embracing 10 to 200 sheets of resin bodies. On such end plates are loaded tantalum carbide weights, which thus weigh on the resin molded bodies. Consequently, in this condition, the hot isostatical pressure treatment is performed. In such condition of being weighed, the resin molded body after burn-carbonizing is hot isostatical pressure (HIP) treated, and generation of warping on the carbon substrate on HIP treatment can be prevented. The graphite jig relaxes an influence of heating by the heater of HIP apparatus, and thus, from this point, generation of warping is suppressed on HIP treatment of the carbon substrate.

A heat conductivity of the end plate may preferably be equal to 20 kcal/m.Hr.° C. or less. If the end plate heat conductivity is larger than 20 kcal/m.Hr.° C., a temperature of the surface of the resin molded body in contact with the end plate arises and an obtained flatness degree of the end plate is degraded.

As hereinbefore described, the tantalum carbide (TaC) weight is placed on the end plate on a highest position of the stacked body of the resin molded bodies, and HIP treatment is performed in such state as the resin molded bodies are weighed. In this case, if TaC continues in contact with the end plate for a long time, both result in bonded by a diffused junction. To prevent bonding of the weight and the end plate, the tantalum carbide weight may preferably be used in an arrangement that it is enclosed within the graphite container, such as a graphite box having a cover etc.

The graphite cylinder and the carbon end plate are in contact with the resin molded body. Therefore, if a metal series impurity is present in the graphite cylinder and the carbon end plate, these metal elements are diffused into resin molded body during HIP treatment, and becomes a cause of the substrate defects. Hence, preferably the graphite cylinder and the carbon end plate may highly be purified so that property thereof includes ash of 100 ppm or less, Fe of 10 ppm or less, Ti of 5 ppm or less, and V of 5 ppm or less. In this way, occurrence of the substrate defects is extremely decreased.

The embodiment of the present invention is concretely described referring to the attached drawings as the following.

Tablet Molding Method

A tablet molding method in an embodiment of the present invention is described referring to FIG. 1. FIG. 1 shows a molding apparatus for a tablet used in a method of manufacturing a carbon substrate according to the embodiment of the present invention. In a tablet 1, thermosetting resin powders with a predetermined composition is pressed at an ordinary temperature to mold a specified tablet shape. A tablet 3 from the tablet 1 is gathered into a stocker 2, and sent from the stocker 2 to a high-frequency preheating furnace 4. The tablet 3 is preheated by the high-frequency preheating furnace 4, and proceeds to dehydration and hardening reaction. The tablet 3 is, after preheated by the high-frequency preheating furnace 4, sent to an aligning apparatus 6 by a conveyer 5. The tablet 3 is stocked on a stocker 9 by the aligning apparatus 6 in an aligning manner. The tablet 3 placed on the stocker 9 is hot-press molded by press molding apparatuses 7 and 8. The tablet 3 is removed of burr on the stocker 9, and remains cooled. Thereafter, the tablet 3 maintains cooled and distortion is eliminated by a distortion eliminating pressing apparatus 10 while being applied pressure, and thus the warping is prevented.

In the method of molding the tablet in the above, after obtaining the tablet 3 by cold molding the hot hardening resin powders in the tablet 1, the tablet 3 is high-frequency preheated by the high frequency preheating furnace 4. In this case, in the high-frequency preheating furnace 4, for example, the six tablets 3 are at the same time contained in one chamber, simultaneously per chamber the six tablets 3 are high-frequency heated, and for one tablet, the dehydration process can be performed in about two minutes, thereby a high productivity is obtained. The tablet 3 after preheating is hot pressed by the molding apparatuses 7 and 8, and after distortion eliminating pressed, burned to manufacture the carbon substrate. A burning time of each tablet is, for example, equal to about 5 to 6 minutes. In this manner, a plurality of tablets 3 are together preheated and thereafter hot pressed to produce the carbon substrate, therefore, within an extremely shortened time the carbon substrates are molded and manufactured.

Next, a method of manufacturing a carbon substrate according to another embodiment of the present invention will be described referring to FIG. 2. The embodiment is to produce the carbon substrate by molding directly from thermosetting resin powders. A set of mold die comprises a disk shaped lower die 21 and a disk shaped upper die 22 and a ring die 23 engaged with the upper die 21 and the lower die 22. In a die assembling 37, the lower die 21 is fit in the ring die 23 to assemble a mold die. In a material input 31, the hot hardening resin powders are input into the ring die 23 engaged with the lower die 21 by a feeder (not shown). In this case, the mold die is at an ordinary temperature and cold filled with the resin powders. After filling the resin, the upper die 22 is engaged into the ring die 23. Then, the powders placed inside are diffused uniformly into the die by a weight of the upper die 22, and comes to a automorphic state, and some of them are hardened.

The mold die filled with resin is carried into a hot molding apparatus 32, where each mold die is piled up embracing a heat table 41, and while heating these for example at 150° C., for example, a 500 ton weight is applied between the lowest heat table 41 and the top heat plate 41, the resin powders are thus hot press molded.

Thereafter, each mold die is removed of its heat table 41, and then carried into a cooling apparatus 33, and piled up embracing therein a water cooling table 42, inside of which is circulated by water, thereby the resin inside the mold die is, while being pressed by such water cooling die as a weight stone, rapidly cooled. Thus, the resin molded body in the mold die is prevented from generation of warping when cooled.

Following the above, the mold die after cooled is sent to a die disassembling apparatus 34, where the ring die 23, lower die 21, and upper die 22 are disassembled, the resin molded body remained inside is taken out. Thus disassembled dies are carried to a die clean apparatus 36 by a carrying apparatus 35, all the dies are cleaned at this die clean apparatus 36. The dies after cleaned are sent to a die assemble 37.

Figure 3:
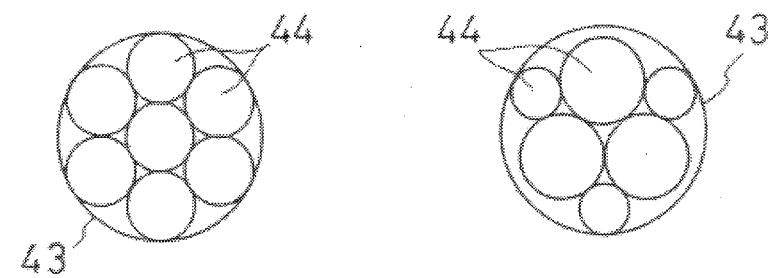
FIG. 3 is a schematic view illustrating a cut-out method of a carbon substrate in the second embodiment.

The resin molded body taken out from the mold die is sent to a die cut apparatus 38, where a plurality of carbon substrates having a predetermined diameter are cut out from the resin molded body. FIG. 3 shows a carbon substrate 44 cut out in a circular ring shape from a resin molded body 43. A cut means includes laser, jet water, punching, and cutting etc. Each carbon substrate 44 is washed and dried at a clean dry apparatus 39, in this way the products are obtained.

The method of this embodiment proceeds to fill raw material powders directly into the die and to mold into a disk shape, this eliminates a process of molding once temporarily into a tablet shape, therefore simplifies the manufacturing process, and reduces a cost required for manufacturing together with simplification of the processes. The die on inserting the resin is at an ordinary temperature, and uniform molded product can be obtained without hardening the resin at the same time of inserting.

The respective methods in embodiments of the invention described above provide a shortened molding time than the conventional example, specifically, the molding time decreases to 10 minutes or less compared to the conventional example necessitating 30 to 60 minutes. Therefore, the cost for manufacturing can be lowered. Particularly, the demand in recent times is directed to such more lower cost of the products under the background that miniaturization in radii of disks has been promoted, where smaller disks such as its diameter 2.5 inches, 1.8 inches, and 1.3 inches are now in practical use. As such is the case, it is extremely advantageous if the manufacturing cost of the carbon substrate is decreased as in the first and second embodiments according to the present invention.

In the following paragraphs, we describe an actually produced carbon substrate in accordance with the method in the embodiment according to the invention and explain, compared to the comparative examples, results of investigating how various characteristics effect the quality of the products.

First, are described the examples in which a condition of HPF is varied. The arrangement as shown in FIG. 2 is to fill phenol-formaldehyde resin powders into a die, to hot press under the condition of examples A1 and A2 and comparative examples a1 and a2, and to produce a molded body of its outer shape of 70 mm having an inner diameter of 10 mm with a plate thickness of 1.2 mm. Thus obtained molded body is heated and burned up to 1200° C. in the nitrogen gas atmosphere. Thereafter, thus burned body is hot isostatical pressure (HIP) treated under the condition of a temperature of 2500° C. and a pressure of 2000 atm through the use of the hot isostatical pressure apparatus, and carbon blank material is produced.

The Example A1:

The material with an average particle size 300 µm, a moisture content 2.0 weight %, HPF 80 mm is used and molded under the condition of a preheating time 1 minute, a molding temperature 160° C., and a pressurizing time 5 minutes, as a result, the satisfactory molded body without grain boundary and without void or pore has been produced.

The Example A2:

The material with an average particle size 500 µm, a moisture content 1.0 weight %, HPF 150 mm is used and molded under the condition of a preheating time 1 minute, a molding temperature 160° C., and a pressurizing time 5 minutes, as a result, the satisfactory molded body without grain boundary and without void or pore has been produced.

The Comparative example a1:

The material with an average particle size 500 µm, a moisture content 1.0 weight %, HPF 50 mm is used and molded under the condition of a preheating time 1 minute, a molding temperature 160° C., and a pressurizing time 5 minutes, as a result of this case, a good amount of grain boundaries remain.

The Comparative example a2:

The material with an average particle size 500 µm, a moisture content 1.0 weight %, HPF 80 mm is used and molded under the condition of a preheating time 1 minute, a molding temperature 160° C., and a pressurizing time 5 minutes, as a result of these, a good amount of voids or pores are generated.

Figure 4:
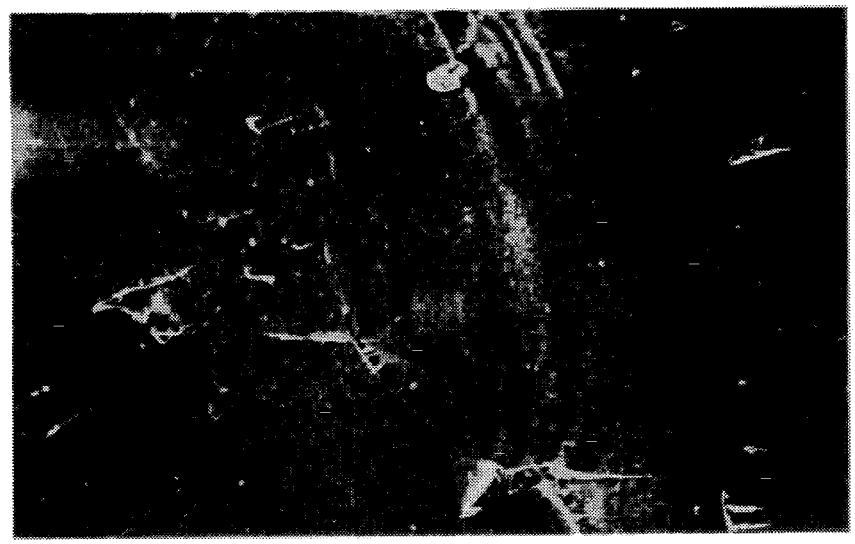
FIG. 4 is a photograph showing a sectional texture of a molded body of the example 1.
Figure 5:
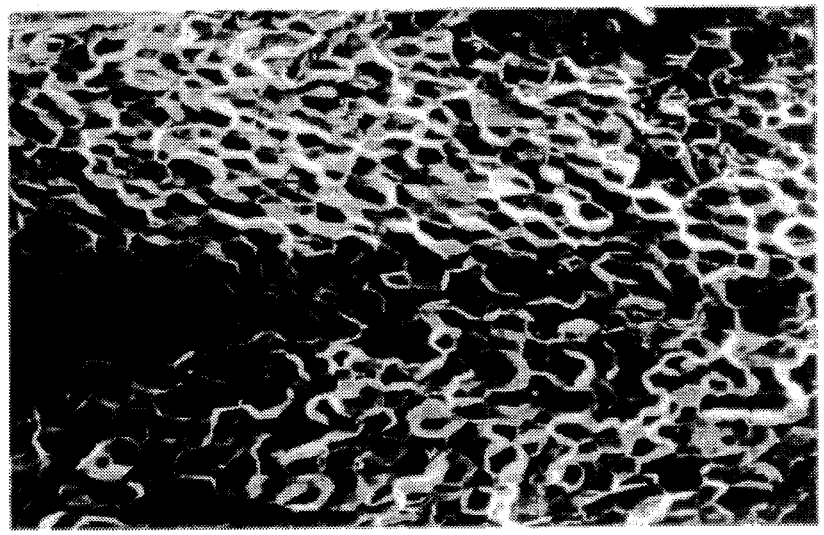
FIG. 5 is a photograph showing a sectional texture of a molded body of a comparative example 1.
Figure 6:
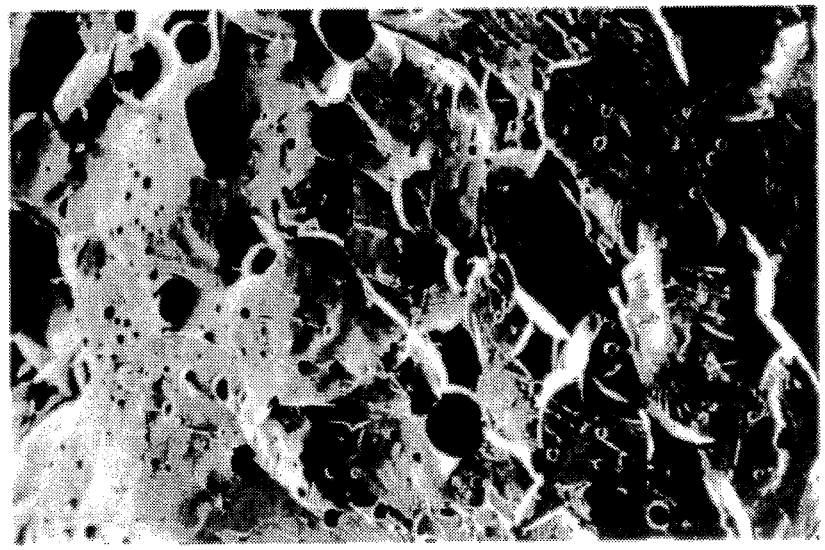
FIG. 6 is a photograph showing a sectional texture of a molded body of a comparative example 2.

FIGS. 4 to 6 are photographs showing organization on sectional views of molded bodies in the examples A1 and the comparative examples a1 and a2. The comparative examples a1 and a2 include a large amount of grain boundaries or voids because HPF is out of the scope of the invention, but the example A1 includes a healthy molded body without those grain boundary and void since HPF is within the scope regulated in the present invention.

Next, we describe an actually produced carbon substrate by using the apparatus shown in FIG. 1, and report on the example with respect to a result of investigating how various changes of this moisture content amount and particle size affect the characteristics under the condition of the examples A3 to A5 and the comparative examples a3 to a5, compared to the corresponding comparative examples. The phenol-formaldehyde resin powders are cold press-treated and molded into a specified tablet shape. The 100 ton oil pressure apparatus is used as a pressurizing apparatus to harden the tablet with a diameter of 4.2 mm and a thickness of 10 mm. This tablet molded body is preheated by the high-frequency heating apparatus, and then hot pressed to produce a molded body with an outer diameter of 70 mm, an inner diameter of 10 mm, and a plate thickness of 1.2 mm.

Thus obtained molded body is heated and burned up to 1200° C. in a nitrogen gas atmosphere, thereafter HIP treated under the condition of 2500° C. and 2000 atm through the use of the hot isostatical pressure apparatus, thereby carbon blank material is produced.

The Example A3:

The material with an average particle size 150 µm and a moisture content 2.0 weight % is molded under the condition of a surface pressure 1000 kg/cm$^2$ and a pressurizing time 10 seconds, as a result, a satisfactory tablet is obtained, and a molded product of the carbon substrate produced using this tablet is healthy one without these grain boundary and void.

The Example A4:

The material with an average particle size 500 µm and a moisture content 2.0 weight % is molded under the condition of a surface pressure 1000 kg/cm$^2$ and a pressurizing time 10 seconds, as a result, a satisfactory tablet is obtained, and a molded product of the carbon substrate produced using this tablet is healthy one without these grain boundary and void.

The Example A5:

The material with an average particle size 1000 µm and a moisture content 1.0 weight % is molded under the condition of a surface pressure 1000 kg/cm$^2$ and a pressurizing time 10 seconds, as a result, a satisfactory tablet is obtained, and a molded product of the carbon substrate produced using this tablet is also healthy one without these grain boundary and void.

The Comparative example a3:

The material with an average particle size 50 µm and a moisture content 2.0 weight % is molded under the condition of a surface pressure 1000 kg/cm$^2$ and a pressurizing time 10 seconds, as a result, because of smaller particle size, a satisfactory tablet is not obtained without automorphicity of the tablet.

The Comparative example a4:

The material with an average particle size 150 µm and a moisture content 0.5 weight % is molded under the condition of a surface pressure 1000 kg/cm$^2$ and a pressurizing time 10 seconds, as a result, because of a small amount of moisture content, a satisfactory tablet is not obtained without automorphicity of the tablet.

The Comparative example a5:

The material with an average particle size 150 µm and a moisture content 4.0 weight % is molded under the condition of a surface pressure 1000 kg/cm$^2$ and a pressurizing time 10 seconds, as a result, a satisfactory tablet is not obtained because of a large amount of moisture content, and as a result of producing a carbon substrate using this tablet, thus obtained carbon substrate generates a large amount of voids.

A modified embodiment of the molding process is described referring to FIG. 1. The molding process is to cold mold the thermosetting resin powders in a tablet 1 to produce a tablet 3, thereafter to high-frequency preheat and dry the tablet 3 by the high-frequency preheating furnace 4, and to hot-press mold this preheated tablet. In this case, the molding process for the tablet shape is the cold molding, this only requires a processing time of an extent of one minute. In the high-frequency preheating furnace 4, for example, six tablets 3 are contained in one chamber, and at the same time per chamber, the six tablets 3 are high-frequency heated, thus the dehydration process per tablet is performed in about two minutes. Accordingly, the high productivity can be realized. The tablet 3 after preheating is hot press molded by the press molding apparatuses 7 and 8, and then subjected to the distortion-eliminating pressure, thereafter burned to produce the carbon substrate. The hot press molding time of each tablet is, for example, about 5 to 6 minutes. In this way, a plurality of tablets 3 are together preheated and then hot pressed to produce the carbon substrate, therefore, according to the present invention, such processing time is considerably shortened as low as within 10 minutes compared to the conventional example requiring 30 to 60 minutes therefor, thus in this case, the manufacturing cost can extremely be lowered.

In next paragraphs, we describe a result where a satisfactory effect is shown and proved through the actually manufactured carbon substrate by the method in the embodiments according to the invention.

The Example B1:

The phenol-formaldehyde resin powders are loaded in 12 g die, and hot pressed in 10 seconds at a surface pressure of 1000 kg/cm$^2$, and a tablet with an outer diameter 42 mm and a thickness 10 mm is produced.

Thus molded tablet is preheated in 60 seconds by the high-frequency heating apparatus, transferred to the specified die, and hot-press molded. The high-frequency preheating is performed on the condition of an output 3 kW and an interval 50 mm between an electrode and the tablet. The hot-press is performed under the condition of a temperature 160° C., a surface pressure 100 kgf/cm$^2$, the required time 3 minutes, a molded body with an outer diameter 70 mm, an inner diameter 10 mm, and a plate thickness 1.2 mm is obtained. In this arrangement, the time required for producing one sheet of molded body is a summarized time of 4 minutes and 10 seconds including 10 seconds for a tablet molding process, 60 seconds for preheating process, and 3 minutes for hot-pressing process.

In a practical production process, the carbon substrate is manufactured on a continuous production line, a most increased time to be a rate controlling during such one cycle line is a hot-press molding process, thus the manufacturing time of the molded body per one product is 3 minutes. If a die capable of simultaneously hot-press molding a plurality of carbon substrates is prepared, 5 to 10 of carbon substrates are hot-press molded at the same time. For such reason, the molding time converted into the time per sheet of molded body is equal to 18 to 40 seconds, the molding time is considerably shortened.

The Comparative Example b1:

The phenol-formaldehyde resin powders are filled into a predetermined die, applied of a surface pressure 100 kg, being heated up at a temperature rising rate of 1° C./minute from 100° C. to 160° C., and hot-press molded. The time required for molding is 60 minutes.

Similarly, a temperature of the same is raised at a rising rate of 2° C./minute from 100° C. to 160° C. and hot-press molded. The time required for molding is 30 minutes, but many voids are generated in the molded body, and it is impossible to obtain a satisfactory molded body.

The Example B2:

A tablet having a shape shown in Tables 1 and 2 are molded, and high-frequency preheated as in the same condition as the example B1, moreover hot-press molded. Table 1 shows one whose T/D is 0.2 to 0.4, and Table 2 shows ones having those out of such values of T/D. Assuming that T(mm) represents an outer diameter of the tablet, and D(mm) represents a thickness of a plate, then as shown in Table 2, when T/D is less than 0.2, sufficient preheating effect is hardly obtained, gas generation on hot-press molding increases, and a satisfactory molded body is not obtained. On the other hand, with T/D exceeding 0,4, hardening at a center of the tablet proceeds together with ununiformity of preheating of tablet to produce not-melted-portion on hot-pressing, thus the uniform molded body is not produced. In contrast to this, those shown in Table 1 whose T/D is within a range of 0.2 to 0.4 do not generate those not-melted-portion and void portion.

TABLE 1

|  | for 2.5 inches | for 1.8 inches | for 1.3 inches |
|---|---|---|---|
| Dimension |  |  |  |
| Diameter | 42 mm | 30 mm | 22 mm |
| Thickness | 10 mm | 10 mm | 7 mm |
| T/D | 0.238 | 0.333 | 0.318 |
| Weight | 15.5 ± 0.2 g | 8.0 ± 0.15 g | 3.0 ± 0.1 g |
| Density | 1.1193 | 1.1193 | 1.1193 |
| Bulk-Density | 0.535 | 0.535 | 0.535 |

TABLE 2

|  | for 1.8 inches | for 1.8 inches |
|---|---|---|
| Dimension |  |  |
| Diameter | 28 mm | 40 mm |
| Thickness | 12 mm | 6 mm |
| T/D | 0.429 | 0.150 |
| Weight | 8.0 ± 0.15 g | 8 ± 0.15 g |
| Density | 1.1193 | 1.1193 |
| Bulk-Density | 0.535 | 0.535 |

As hereinbefore described, according to the present invention, the thermosetting resin powders are cold molded in a tablet shape, thereafter preheated, and then hot-press molded to mold a specified shaped carbon substrate, thereby the time required for manufacturing process can considerably be reduced, and in addition, because of cold molding, a uniform tablet can be obtained and generation of defect of the substrate is avoided.

Figure 2:
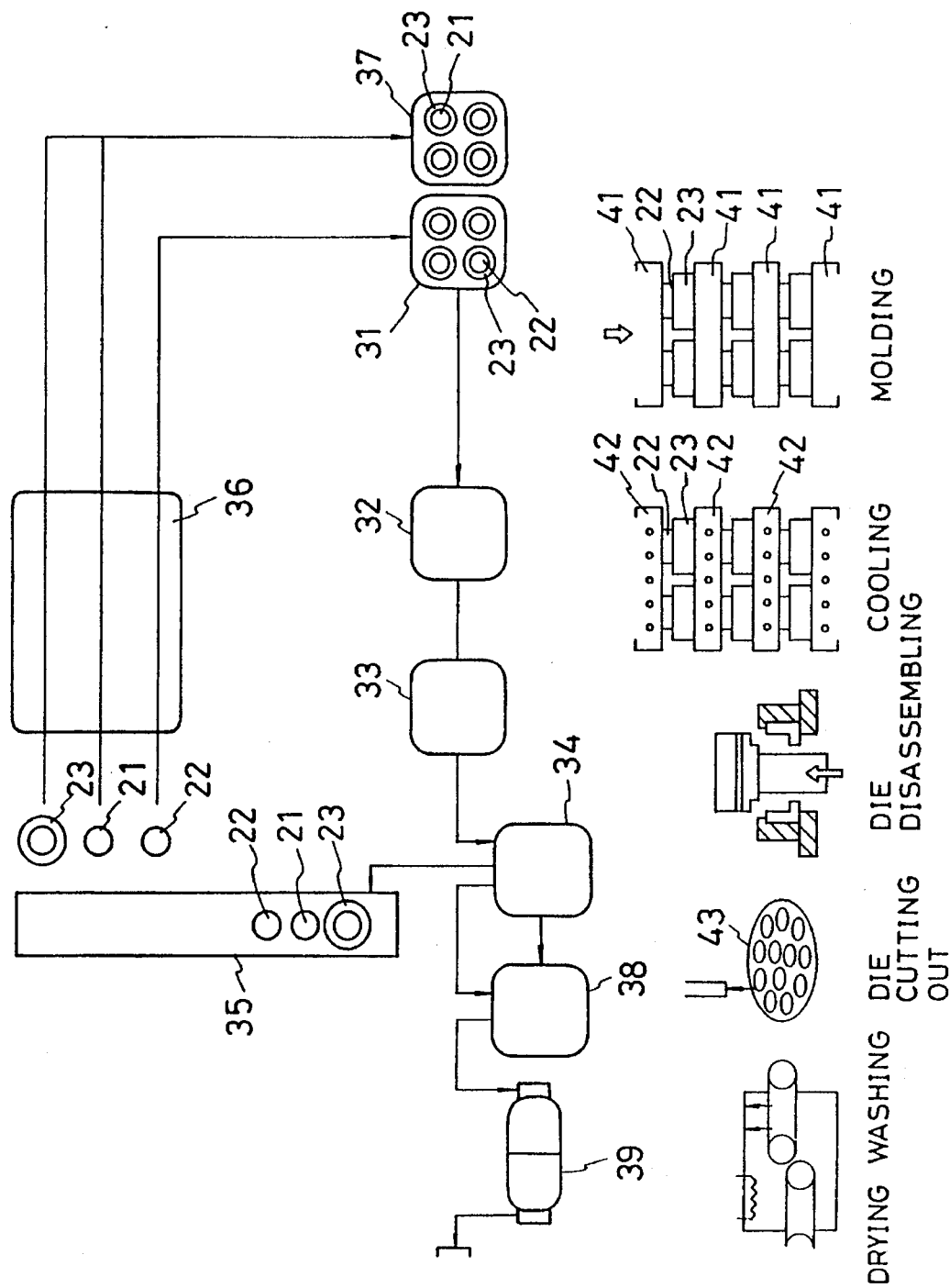
FIG. 2 is a schematic view showing a second embodiment of the present invention.

Next, we explain further another modified embodiment of a tablet molding process referring to FIG. 2. This modified embodiment is to mold the carbon substrate directly from the thermosetting resin powders.

In FIG. 2, we actually prepare a carbon substrate in accordance with a method of the embodiment of the present invention and investigate how various characteristics affect the product quality. A result therefrom is reported compared to comparative examples.

The phenol-formaldehyde resin is filled in a die a set of which includes a ring die 23 with a outer diameter 250 mm, an inner diameter 230 mm and a thickness 20 mm and an upper die 22 and a lower die 21 each with an outer diameter 229 mm and a thickness 9.93 mm. This material resin powders are uniformly dispersed into the die by weight of the die supplied automatically from a feeder, and result in an automorphic state. The die is held in a multi-stage type heat table 41 heated at a temperature 160° C., and hot-pressed in 20 minutes at a surface pressure 100 kgf/cm². The die after such hot-pressing is held in the cooling table 42 provided therein with water cool piping, and the die is cooled in a manner of being pressed. The die after cooled is disassembled to produce the molded body with an outer diameter 230 mm and a plate thickness 1.2 mm. Thereafter, seven disks in a product shape of the carbon substrate with an outer diameter 68 mm and an inner diameter 8 mm are cut out from each molded body by jet water flow. Thus obtained disk shaped molded bodies are burned up to 1200° C. in a nitrogen atmosphere, and then applied 2000 atm at a high temperature 2500° C. to be HIP processed, thus the carbon blank material is produced.

As a result of these, the satisfactory molded body without these grain boundary and void (pore) is obtained. The manufacturing time thereof is within on minute per sheet of product. This is a considerably reduced value compared to the conventional example.

As hereinbefore fully described, according to the present invention, the thermosetting resin powders are inserted into the die at an ordinary temperature, and then directly hot-pressed molded, thereafter cut out into a predetermined shape, thereby one near the product shape can be obtained. Therefore, the manufacturing time is considerably reduced with simplified production process, and not requiring a tablet molding process as in the conventional example. For this reason, also the present invention achieves reduction of cost for manufacturing. The filling of resin powders is performed into the die at an ordinary temperature, thus without hardening promotion during inserting the powders, the uniform molded body is prepared together with prevention of defect in the carbon substrate.

Here, a characteristic of the embodiment of a method of mirror polishing in the present invention is described in comparison with comparative examples. First, a polishing condition of a substrate is explained.

The Substrate Proposed to Mirror Finishing

Substrate material according to examples C1 to C6 and comparative examples c1 to c6 all are manufactured by the same process, machined into a 3.5 inches substrate with a plate thickness of 1.285 mm, where is used an amorphous carbon substrate made of carbon material provided with a predetermined end surface treatment. A pre-treatment of a surface thereof is a lapping treatment by a free abrasive grain type of a concentration 20 weight % using GC (green silicon carbide polishing material) ™3000 abrasive grain which is one of a crushed silicon carbide series abrasive grain whose particle size is 4 µm. For a polishing machine, the SPEEDFAM Corp. 9B5L Type Two-Side Polishing Machine is employed. On mirror finishing, a polishing relief (clearance) for one-side surface is made 12.5 µm. Each largeness of defect and the number of defects after mirror finishing are determined using a magnetic disk defect inspection apparatus.

Determination of the Number of Proper Defects in Substrate

When mirror polishing, using a tin wheel with a diameter of 12 inches and by aqueous solution in which the diamond abrasive grain with 0.5 µm size is dispersed, then the largeness of defect and the number of defects in the substrate provided with a one-side lapping are determined. It has been considered that such determination is substantially coincident to defect value of the substrate.

The Examples C1 to C5:

Through the use of a wheel in which RODEL NITTA Corp. IC-60 Full Hard Pad is attached on the wheel of the SPEEDFAM Corp. 9B5L Type Two-Side Polishing Machine, there performs the polishing by the corresponding polishing assistant aqueous solution of a concentration 1 weight % in which alumina abrasive grain of weight % rate of 4% is dispersed.

The Comparative Examples c1 to c2

Through the use of a wheel in which RODEL NITTA Corp. IC-60 Full Hard Pad is attached on the wheel of the SPEEDFAM Corp. 9B5L Type Two-Side Polishing Machine, there performs the polishing by the aqueous solution which entirely does not contain the corresponding polishing assistant in which alumina abrasive grain of weight % rate of 4% is dispersed.

The Example C6:

Through the use of a wheel in which TAIHO KOGYO Co., TLB Alumina Abrasive Grain is attached on the 9B5G type polishing machine of SPEEDFAM Corp. with a two-side polishing type, then the wet grinding and polishing is performed by the corresponding polishing assistant aqueous solution of a concentration 1 weight %.

The Comparative example c3:

Through the use of a wheel in which TAIHO KOGYO Co., TLB Alumina Abrasive Grain is attached on the 9B5G type polishing machine of SPEEDFAM Corp. with a two-side polishing type, then the wet grinding and polishing is performed by the aqueous solution which entirely does not contain the corresponding polishing assistant.

Table 3 designates the largeness of defect and the number of defects after mirror finishing together with quality and a particle size of alumina polishing fine powders according to those examples and comparative examples. In addition, Table 3 shows the number of defects proper to the substrate in accordance with the regulation in the above. As is apparent from Table 3, through the use, as a polishing assistant, the water soluble inorganic material constituting the oxidation group and aluminum salt formed of bichromate acid group, nitric acid group or chlorine group, basically a largeness of defect and the number of such defects per unit area can considerably be reduced approximating a level of defect proper to the substrate although the largeness and the number of defects differ depending on a particle size, hardness, crystal characteristic and the like of the alumina polishing fine powders. In contrast to this, when the polishing assistant is not used (comparative example), unmeasurable large number of defects are generated in any of the cases.

TABLE 3

| Kind of Alumina Abrasive Grain | Particle Size of Abrasive Grain μm | Kind of Polishing Assistant | Number of Defects, 20 μm or more Size, per Surface | Number of Defects, 10–20 μm Size, per Surface |
|---|---|---|---|---|
| Defect Proper to Substrate | | | 30 | 40 |
| Example | | | | |
| C1 | γ Alumina | 0.05 | Aluminum Nitrate | 40 | 50 |
| C2 | α Fine Particle Alumina | 0.1 | Aluminum Nitrate | 210 | 240 |
| C3 | α Fine Particle Alumina | 0.1 | Aluminum Hydrochloride | 230 | 270 |
| C4 | WCA Alumina | 2.5 | Aluminum Nitrate | 320 | 370 |
| C5 | WA Alumina | 1.2 | Aluminum Nitrate | 960 | 1330 |
| C6 | WA Alumina | 1.2 | Aluminum Nitrate | 210 | 240 |
| Comparative Example | | | | |
| c1 | γ Alumina | 0.05 | — | unmeasurable | unmeasurable |
| c2 | WA Alumina | 1.2 | — | unmeasurable | unmeasurable |

Next, we describe a result of study for an influence on a polishing efficiency by the polishing assistant. Through the use of a wheel in which RODEL NITTA Corp. IC-60 Full Hard Pad is attached on the wheel of the SPEEDFAM Corp., 4B6P Type Two-Side Polishing Machine, we have performed the polishing in 40 minutes by using WA alumina abrasive grain of an average particle size 1.2 μm with a weight % rate of 4% and polishing liquid containing dispersed undermentioned polishing-assistant or polishing assistant aqueous solution or pure water, then a material removal speed is investigated.

Figure 7:
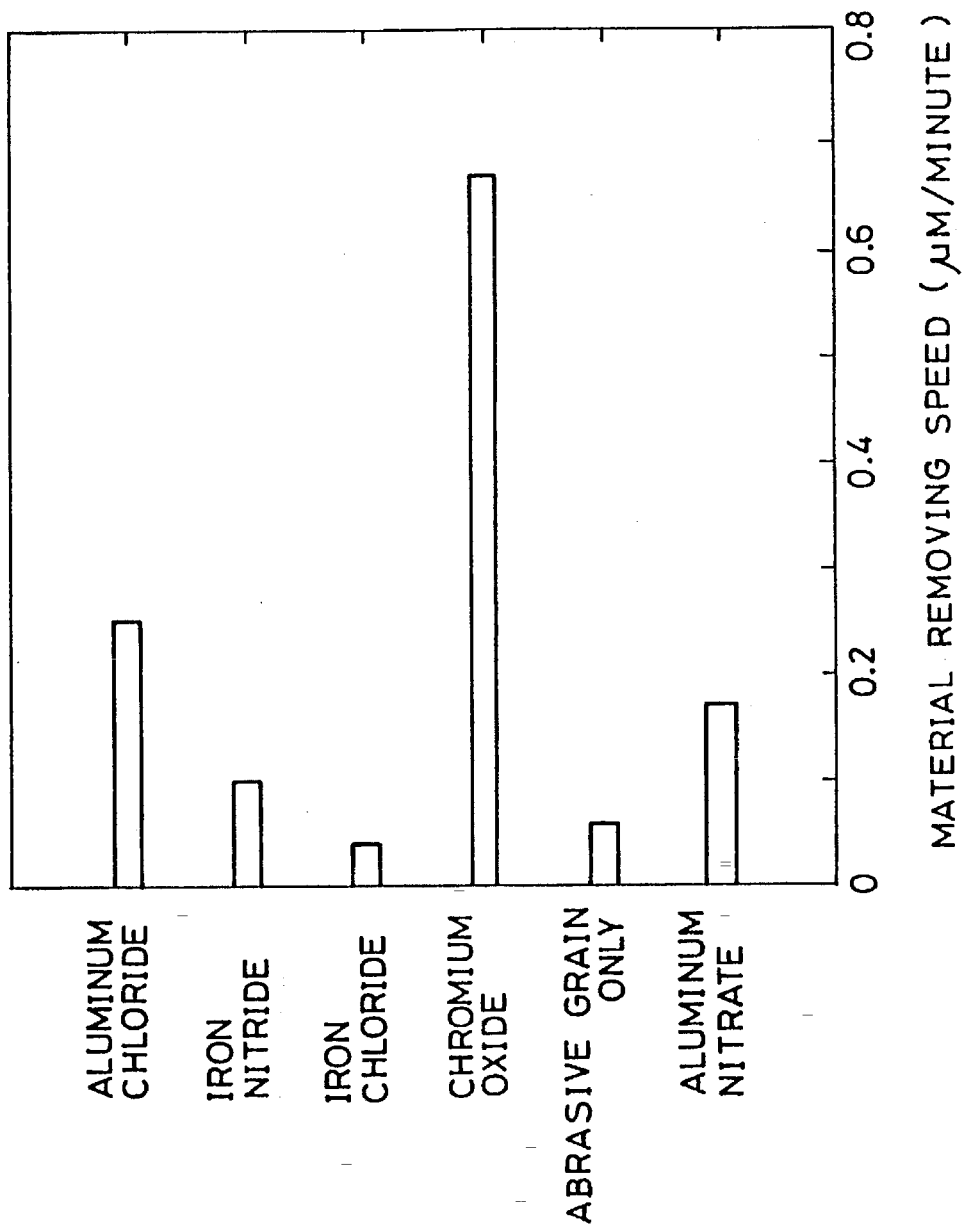
FIG. 7 is a graphical representation showing a relationship between kinds of polishing assistants and a material removing speed which exhibit effect of the invention.

(1) 1% aluminum chloride ($AlCl_3 \cdot H_2O$) aqueous solution (2) 1% iron nitrate ($Fe(NO_3)_3 \cdot 9H_2O$) aqueous solution (3) 1% iron chloride ($FeCl_3 \cdot 6H_2O$) aqueous solution (4) 1% chromium oxide ($CrO_3$) ($Al_2O_3 + 6CrO_3 \rightarrow Al_2(Cr_2O_7)_3$ in the polishing liquid) aqueous solution (5) pure water (6) 1% aluminum nitrate ($Al(NO_3)_3 \cdot 9H_2O$) solution An obtained speed for material removing is shown in FIG. 7 for comparison. As is apparent from FIG. 7, in case where water soluble inorganic material constituting an aluminum salt with an oxidation group in the polishing liquid is used, a considerably graded polishing efficiency is obtained compared to only the abrasive grain. Thus, a high quality of precise member and a high efficient process are available in the use of such water soluble inorganic material constituting an aluminum salt with an oxidation group in the polishing liquid. Moreover, as is apparent from FIG. 7, particularly when using strong oxidizer such as chromium trioxide as a polishing assistant, a high speed for material removing is obtained.

With such strong oxidizer of chromium trioxide presented, a high concentration exceeding 5% provides excessive effect rate of a chemical polishing in mechanochemical polishing and tends to produce deteriorated surface roughness. For this reason, a concentration of the chromium trioxide may preferably be equal to or less than 5 weight %.

For an oxidization polishing assistant according to the invention, strong oxidizer such as sodium chlorate other than the chromium trioxide may be used.

As hereinbefore described, the present invention employs extremely inexpensive alumina abrasive grain as a polishing agent in comparison with the expensive diamond abrasive grain as a polishing agent, using water soluble inorganic material constituting an aluminum salt with an oxidization group in polishing liquid as a polishing assistant, then a high quality polished surface is obtained together with an extremely higher polishing efficiency because a surface layer of the carbon substrate is softened and etched by that polishing assistant. For such reason, it is possible to perform a great amount of polishing and treatment for mass-production with respect to mirror finishing of the carbon substrates in the use of the two-side polishing machine ordinarily employed in the industrial scale. Therefore, the carbon substrates, which have conventionally been only on a stage where it is proposed as a specimen or a sample, now come to be stably supplied in an industrial scale maintaining the vast number of products. The present invention therefore considerably contributes to realizing a lower cost and a stable supply of the carbon substrates.

A kind and a particle size of the alumina abrasive grain to be used may preferably be selected depending on both a quality of the carbon substrate itself to be an object of polishing and a demand of quality as a commodity. It is not always required to make all the mirror finishing processes to be in the same condition. That is, two stages of mirror finishing treatments may preferably be employed; namely, one for pretreatment where for the purpose of primary betterment of the substrate surface a mirror treatment is provided weighing a graded speed of polishing; and another for thereafter treatment where a final mirror polishing and finishing are provided. In such treatment, a required cost for treatment is more reduced than described.

Figure 8:
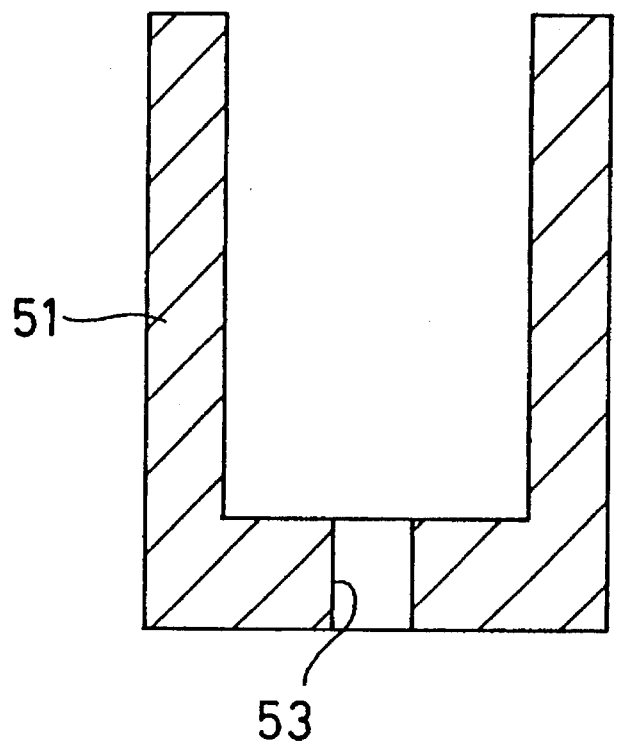
FIG. 8 is a vertical sectional view showing a graphite cylinder used in the embodiments of the invention.
Figure 9:
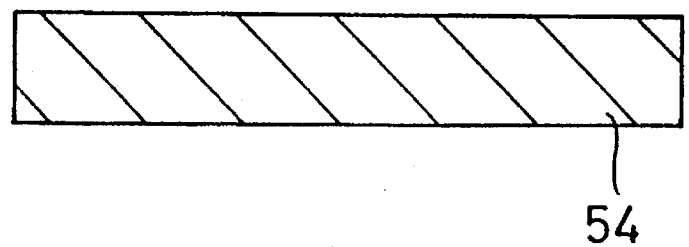
FIG. 9 is a sectional view showing graphite spacer used in the embodiments of the invention.

An embodiment of burn-carbonizing process according to the present invention is described. FIG. 8 is a vertical sectional view showing a graphite cylinder used in the embodiment of the invention, and FIG. 9 is a sectional view showing a graphite spacer thereof of the same. A graphite cylinder 51 is of a cylindrical shape having a bottom plate, which is provided with a hole 53 for improving convection.

Figure 10:
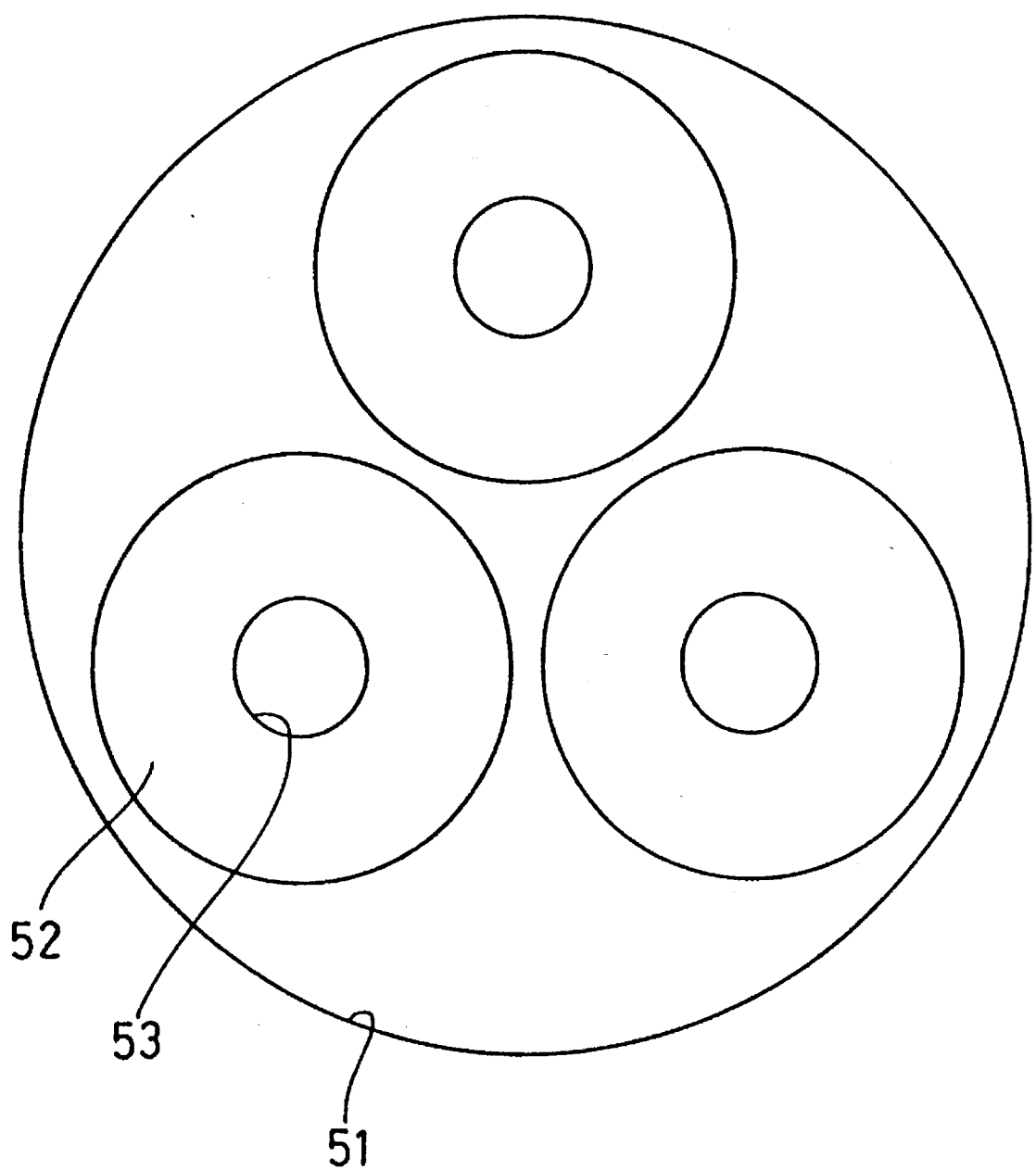
FIG. 10 is a schematic view showing an internal of a graphite cylinder thereof of the same.

The three holes 53 are provided as shown in FIG. 10 where an inside of a cylinder 51 is schematically shown, and a plurality of resin molded bodies 52 each in a circular ring shape centered each hole 53 are stacked each other. These resin molded bodies 52 of a circular ring shape hold a spacer 54 at every sheet basis or at every plurality of sheet basis shown in FIG. 9. For a top of this stacked body, further on the spacer 54 is loaded a weight (not shown) of the same shape as the spacer 54 made of tungsten carbide. In this way, the stacked body of the thermosetting resin molded body is incorporated in the graphite cylinder 51, and inside the stacked body is inserted the graphite spacer, and loaded on its top with the weight. Therefore, each thermosetting resin molded body is heated uniformly and generation of warping on burning is prevented. Next, we describe a result of evaluation for a characteristic of the carbon substrate actually manufactured in accordance with a method of the embodiment according to the invention.

The Example D1:

First, the phenol-formaldehyde resin is hot-pressed to produce a resin molded body with an outer diameter 85 mm, an inner diameter 15 mm, and a plate thickness 1.3 mm. The resin molded body is stacked alternatively with the spacer made of carbon, thus produced stacked body is incorporated into the cylinder made of carbon with an outer diameter 108 mm, an inner diameter 88 mm, and a height 630 mm. A top thereof is placed with a tungsten carbide weight and pressed by the specified load. The carbon spacer with a flatness degree of 5 μm is used.

Following this, $N_2$ gas, flowing within a heat treatment furnace, is heated up to a temperature 1400° C. for heat treatment, where the carbon substrate is burned. Thereafter, a surface of the carbon substrate is polished by the two-side polishing machine, outer edges and inner edges and end surfaces are machined, thus, a carbon substrate is produced in which it has an outer diameter 65 mm, an inner diameter 20 mm, a plate thickness 0.889 mm, and a surface roughness Ra 8 Å.

For comparison, a percent defective of a flatness degree of the obtained carbon substrate is determined where conditions such as presence of the carbon cylinder, a flatness degree of the spacer, a heat conductivity, and presence of the tungsten carbide weight are changed. A result thereof is shown in Table 4.

TABLE 4

| | Carbon Cylinder | Spacer | Weight | Percent Defective of Flatness degree |
|---|---|---|---|---|
| Example D1 | Presence | A (5 μm) | Presence | 1% |
| Comparative Example | | | | |
| d1 | Non | A (5 μm) | Presence | 75% |
| d2 | Presence | B (5 μm) | Presence | 15% |
| d3 | Presence | A (15 μm) | Presence | 32% |
| d4 | Presence | A (5 mm) | Non | 26% |

In table 4, the term "percent defective of a flatness degree" means a generation rate of those having a flatness degree equal to or more than 10 μm in a final completed product of the carbon substrate. The flatness degree is determined by an optical type flatness measurement apparatus. A spacer A has a heat conductivity 95 kcal/m.Hr.° C., and a spacer B has a heat conductivity 132 kcal/m.Hr.° C.

As is apparent from Table 4, the comparative example d1 which does not use the carbon cylinder is affected of direct heat from a heater on heat-treatment, and in this case a considerably increased warping is generated in the carbon substrate products.

The comparative example d2, in which a heat conductivity of the carbon spacer exceeds 100 kcal/m.Hr.° C., provides a considerably higher temperature of the carbon spacer in comparison with the resin molded body, thereby the warping increases.

The comparative example d3, in which a flatness degree of the carbon spacer itself is degraded, transfers its warping to the resin molded body.

The comparative example d4, which does not use the tungsten carbide weight having an effect suppressing warping, deteriorates a percent defective of the flatness degree.

The Example D2:

A carbon substrate is produced as in the example D1 where compositions of the carbon cylinder and the spacer used on burning are varied into a plurality of ways. Assuming C where the compositions of the carbon cylinder and the spacer are highly purified as ash of 100 ppm or less, Fe of 10 ppm or less, Ti of 5 ppm or less and V of 5 ppm or less, and D of cases having compositions out of such composition described. The defects present on the surface of substrate are inspected using the laser type defect analysis apparatus.

Table 5 designates the number of defects per surface of thus obtained substrate, Table 6 designates purity of the carbon cylinder and the carbon spacer.

TABLE 5

| | Carbon Cylinder | Spacer | Number of Defects Pieces/Surface |
|---|---|---|---|
| Example D2 | C | C | 2.2 |
| Comparative Example | | | |
| d5 | C | D | 320.5 |
| d6 | D | C | 156.3 |

TABLE 6

| | Ash | Fe | Ti | V |
|---|---|---|---|---|
| Carbon Cylinder | | | | |
| C | 54 | 5 | 3 | 2 |
| D | 182 | 24 | 8 | 9 |
| Carbon Spacer | | | | |
| C | 48 | 6 | 2 | 2 |
| D | 187 | 25 | 13 | 8 |

Figure 11:
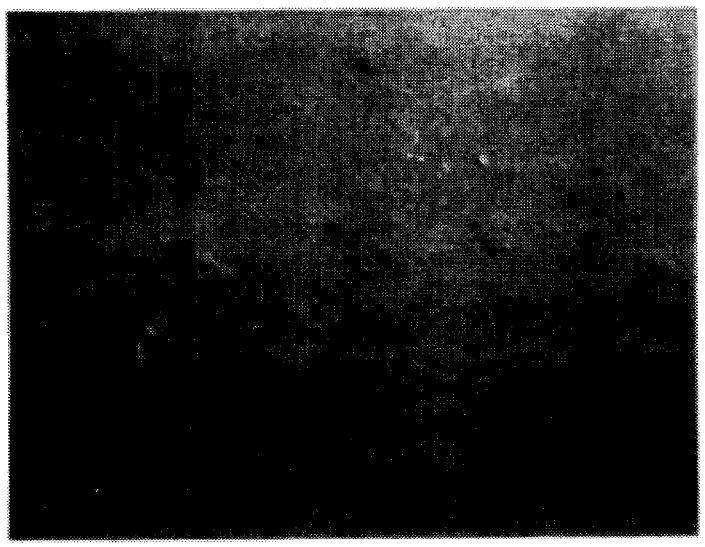
FIG. 11 is a photograph of a metallographic microscope showing typical graphite defect.

As is apparent from Table 5, when purity of the carbon cylinder and the carbon spacer are lower, impurity elements are diffused into resin molded body during burning, the number of defects is increased. Most of metallic elements, particularly, Fe, Ti, and V act as a catalyst for producing graphite, thus if these components are contained in large amount, graphite partially generates to be substrate defects. FIG. 11 is a photograph of a metallographic microscope showing a typical defect in graphite.

As hereinbefore described, according to the present invention, the thermosetting resin is filled in the graphite cylinder as holding a graphite spacer therebetween at every sheet basis or at a plurality of sheet basis, the tungsten carbide weight is placed on top thereof, thus the thermosetting resin is burn-carbonized by heating from the outside of the cylinder, warping of the substrate after burn-carbonizing is reduced, thereby the productivity is considerably improved together with shortening of the polishing time. A high purification of the graphite cylinder and spacer provides prevention of diffusion of metallic impurities into material of during burn-carbonizing, and extremely reduces generation of the defects within the substrate.

Figure 12:
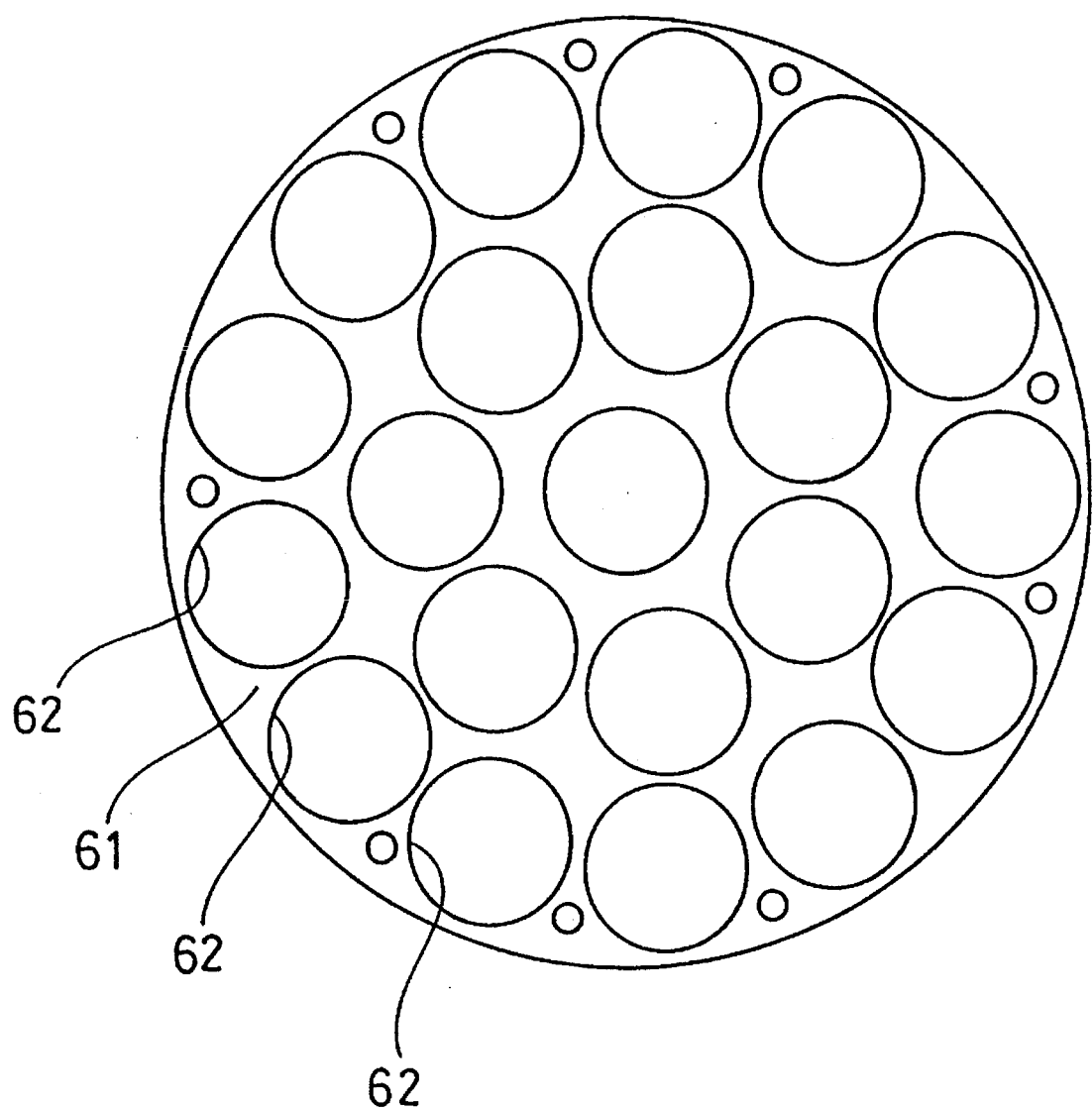
FIG. 12 is a plan view showing a graphite jig used in the embodiments of the invention.
Figure 13:
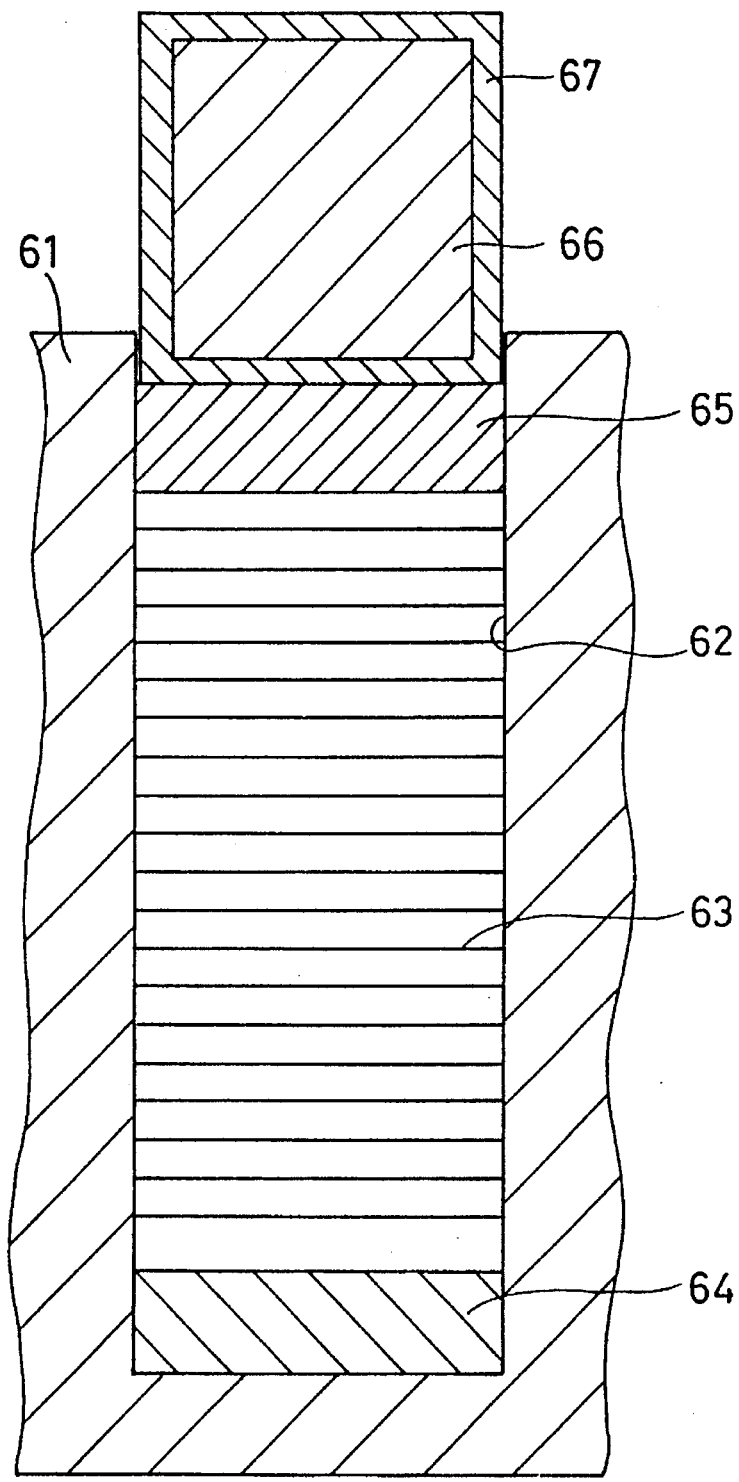
FIG. 13 is a vertical sectional view thereof of the same.

A method of hot isostatical pressure treatment according to the present invention is described referring to the attached drawings. FIG. 12 is a top view of a graphite jig used for a method of an embodiment according to the present invention. A graphite jig 61 is of a cylindrical shape as a whole, a plurality of (21 pieces in the drawing, for example) bottomed cylindrical shaped holes 62 are provided in its axis direction in parallel with each other. FIG. 13 is a sectional view showing one example of these holes 62. A carbon end plate 64 is placed on the lowest portion of the hole 62, and for example, 10 to 200 sheets of resin molded bodies 63 are stacked on the end plate 64. An end plate 65 is placed on a stacked body of the resin molded bodies 63, further a tantalum carbide weight 66 is placed on the end plate 65. The weight 66 is contained in a graphite container 67 having a cover, and sealed within the container 67 by closing the cover.

As in the arrangement, the stacked body of the resin molded bodies 63 after burn-carbonizing is incorporated inside the graphite jig 61, and while a load by the weight 66 is being applied, the hot isostatical pressure treatment is performed. Thereby, warping of thus obtained carbon substrate is prevented. The weight 66 is enclosed within the graphite container 67, this prevents diffused junction of the tantalum carbide weight 66 and the carbon end plate 65 on HIP treatment. The carbon end plates 64 and 65 and the graphite jig 61 are highly purified for ash of 100 ppm or less, Fe of 10 ppm or less, Ti of 5 ppm or less, and V of 5 ppm or less. This arrangement therefore eliminates generation of substrate defects due to impurity diffused into the carbon substrate.

Then, we report, in comparison with the comparative example, a result of a characteristic of the carbon substrate actually prepared in accordance with a method of an embodiment according to the present invention, The Example E1:

The phenol-formaldehyde resin is hot-press molded to produce a resin molded body with an outer diameter 85 mm, an inner diameter 15 mm, and a plate thickness 1.3 mm. These resin molded bodies are stacked in the carbon cylinder with an outer diameter 108 mm, an inner diameter 88 mm, and a height 630 mm alternately embracing the carbon spacers each other. On a top thereof is placed the tungsten carbide weight and is pressed by a predetermined constant load. The carbon spacer of a flatness degree 5 μm is used. This flatness degree is a height difference between a highest position and a lowest position on surface of the spacer. In the next process, while $N_2$ gas is allowed to flow within the heat treatment furnace, heating up to 1400° C. for heat treatment, the resin molded body is burn-carbonized to produce the carbon substrate.

Thereafter, the carbon substrate after burning is, as shown in FIG. 12, filled within the hole 62 of the graphite jig 61, the graphite jig 61 being provided with 21 pieces of holes 62 (diameter is 73 mm). The graphite jig 61, for example, has an outer diameter 430 mm, and a height 950 mm. In each hole 62, the carbon substrate after burn-carbonizing is stacked in a manner of being arranged at every 100 sheet basis with the one sheet of end plate having a thickness of 20 mm. The top of each stacked body is placed with the tantalum carbide weight in the condition of being sealed in the carbon container, and pressed by a predetermined load. In this situation, HIP treatment at 2500° C. and 2000 atm is performed, and pore in the carbon substrate material is removed.

The carbon substrate after HIP treatment is polished by the two-side polishing machine, and machined of the outer diameter, inner diameter and end surface, then the carbon substrate with an outer diameter 65 mm, an inner diameter 20 mm, and a plate thickness 0.889 mm, and a surface roughness Ra 8 Å is produced.

Each percent defective of flatness degree of respective carbon substrates is compared to each other in preparing the examples within a scope of the present invention and the comparative examples out of a scope of the invention in respect of presence of the carbon jig, a kind of the end plate, and presence of the tantalum carbide weight. A result of such comparison is shown in Table 7.

A kind of the end plate depends on a thickness and a heat conductivity as shown in FIG. 7.

A percent defective of a flatness degree is a generating rate of the substrates in final products (carbon substrates) with a flatness degree equal to or more than 10 μm. The flatness degree is obtained by determining a height difference between the highest position and the lowest position of the substrate by the optical type measurement apparatus.

TABLE 7

| | Carbon Jig | End Plate | Tantalum Carbide Weight | Percent Defective of Flatness Degree |
|---|---|---|---|---|
| Example | | | | |
| E1 | Presence | A (Every 100 Sheet Basis) | Presence | 3% |
| Comparative Example | | | | |
| e1 | Non | A (Every 100 Sheet Basis) | Presence | 98% |
| e2 | Presence | B (Every 100 Sheet) Basis) | Presence | 25% |
| e3 | Presence | A (Every 100 Sheet Basis) | Non | 23% |
| e4 | Presence | C (Every One Sheet Basis) | Presence | 2% |
| e5 | Presence | C (Every One Sheet Basis) | Non | 3% |

TABLE 8

| | Thickness (mm) | Heat Conductivity (kcal/m · Hr · °C.) |
|---|---|---|
| A | 10 | 10 |
| B | 10 | 95 |
| C | 3 | 95 |

In Table 7, in case where HIP treatment is performed without using the carbon jig (comparative example e1), a flatness degree of the carbon substrate is considerably deteriorated directly affected heat of the HIP heater.

With larger heat conductivity of the end plate (comparative example e2), warping is larger due to a larger temperature difference between substrates because the end plate has a far higher temperature than that of the carbon substrate.

The use of the tantalum carbide weight exhibits a notable effect such that a flatness degree in case of the example E1 of the invention is more improved compared to those without using the weight (comparative example e3).

The example E1 optimizes a heat conductivity of the end plate, and reduces the times of using the end plate through effect of the weight, thus the productivity is considerably improved.

Each comparative examples e4 and e5 uses an end plate with a thickness of 3 mm at every substrate basis. The example E1 has the same extent of percent defective of a flatness degree as in the comparative examples e4 and e5. and a productivity thereof is about four times of comparative examples e4 and e5.

The Example E2:

For the carbon jig and the end plate used during the HIP treatment, a considerable high purity is employed such as ash 100 ppm or less, Fe. 10 ppm or less, Ti 5 ppm or less, and V 5 ppm or less, and the carbon substrate is produced in the same manner as in the Example E1.

The defect existing on surface of this carbon substrate is inspected using the laser type defect analysis apparatus (QC Optics Corp., D1-7000).

For the comparative example, the carbon jig and the end plate which are not yet purified are prepared, the number of defects per surface with respect to the obtained carbon substrate is compared. The result thereof is shown in Table 9. Table 10 designates a purity (ppm) of the carbon jig and end plate. In table 9 and 10, D designates those within a scope of the present invention, and E designates those out of a scope of the invention.

TABLE 9

|  | Carbon Jig | End Plate | Number of Defect (PCs/Surface) |
|---|---|---|---|
| Example E2 | D | D | 2.2 |
| Comparative Example |  |  |  |
| e6 | D | E | 352.5 |
| e7 | E | D | 125.6 |

TABLE 10

|  | Ash | Fe | Ti | V |
|---|---|---|---|---|
| Carbon Jig |  |  |  |  |
| D | 30 | 4 | 1 | 1 |
| E | 320 | 43 | 23 | 15 |
| Plate |  |  |  |  |
| D | 80 | 6 | 3 | 2 |
| E | 180 | 25 | 19 | 10 |

Figure 14:
FIG. 14 is a metallographic microscope showing substrate defect (graphite defect).

In Table 9, with a degraded purity of the carbon jig and plate, impurity elements are diffused into the carbon substrate during HIP treatment. Most of metallic elements, particularly, Fe, Ti and V act as a graphite catalyst, and therefore partially produce graphite which comes to provide a substrate defect. A photograph of the metallographic microscope designating a typical graphite defect is shown in FIG. 14.

As hereinbefore fully described, the present invention utilizes the graphite jig provided with a hole for containing the resin molded body, embraces the resin molded body by the carbon end plate, and performs the hot isostatical pressure treatment in a manner of being applied a load of the tantalum carbide (TaC) weight, thus warping of the carbon substrate on HIP treatment can be prevented.

The graphite jig and end plate are high purified, and generation of the substrate defect can considerably be reduced while preventing diffusion of the metal impurity into material on HIP treatment.

What is claimed is:

1. A method of manufacturing a carbon substrate comprising the steps of:

hot-molding a material consisting essentially of a thermosetting resin powder to be a hard carbon substrate after burn-carbonizing, the thermosetting resin powder being of a particle size equal to or more than 150 μm and a HPF of 80 to 150 mm and a moisture content of 1.0 to 3.0 weight % and Fe, Ni, Si and Ca each equal to or less than 5 ppm;

burning a molded body obtained by said hot-molding step to carbonize said molded body; and mirror-polishing a burned body obtained by said burning step.

2. A method of manufacturing a carbon substrate according to claim 1, wherein said hot-molding step comprises the steps of;

molding in a tablet shape at an ordinary temperature resin powders to be a hard carbon material after burn-carbonizing;

preheating and drying the obtained tablet; and hot-press molding the tablet after preheating.

3. A method of manufacturing a carbon substrate according to claim 2, wherein the shape of the tablet has T/D of 0.2 to 0.4, where D represents a diameter and T represents a thickness.

4. A method of manufacturing a carbon substrate according to claim 1, wherein the hot-molding step comprises the steps of;

filling into a die the resin powder to be the hard carbon material after burn-carbonizing;

hot press molding the resin filled into the die into a disk shape; and cutting out a carbon substrate with a predetermined product shape from the obtained molding body.

5. A method of manufacturing a carbon substrate comprising the steps of:

a) hot-molding a thermosetting resin powder to be a hard carbon substrate after burn-carbonizing, the thermosetting resin powder being of a particle size equal to or more than 150 μm and a HPF of 80 to 150 mm and a moisture content of 1.0 to 3.0 weight % and Fe, Ni, Si and Ca each equal to or less than 5 ppm;

b) burning a molded body obtained by said hot-molding step to carbonize said molded body; and c) mirror-polishing a burned body obtained by said burning step, wherein the mirror-polishing step is a step of mirror polishing using water, alumina abrasive grain and a polishing assistant, the alumina abrasive grain being dispersed by 10 weight % or less into polishing liquid containing water and the polishing assistant, the polishing assistant being a water soluble inorganic material constituting an aluminum salt with an oxidization group selected from a group of bichromate acid group and nitric acid group and chlorine group in water.

6. A method of manufacturing a carbon substrate according to claim 5, wherein the alumina abrasive grain is selected from a group of a crushed alumina series abrasive grain with a average particle size equal to or less than 2 μm, a hexagon plate shaped alumina series abrasive grain with an average particle size equal to or less than 5 μm, and a calcination alumina series abrasive grain with an average particle size equal to or less than 1 μm.

7. A method of manufacturing a carbon substrate according to claim 5, wherein the oxidizer is selected from a group of aluminum nitrate, chromium trioxide and aluminum chloride.

8. A method of manufacturing a carbon substrate according to claim 7, wherein the chromium trioxide is equal to or less than 5 weight %.

9. A method of manufacturing a carbon substrate according to claim 5, wherein the carbon substrate is polished by a wheel attached with a hard pad having a hardness equal to or more than 60 using aqueous solution of the polishing assistant dispersed therein with the alumina abrasive grain.

10. A method of manufacturing a carbon substrate according to claim 5, wherein the carbon substrate is lapped by a wheel attached with alumina abrasive grain converted into an abrasive stone using aqueous solution of the polishing assistant.

11. A method of manufacturing a carbon substrate according to claim 5, wherein the alumina abrasive grain contains a main component of γ alumina crystal.

12. A method of manufacturing a carbon substrate comprising the steps of:

a) hot-molding a thermosetting resin powder to be a hard carbon substrate after burn-carbonizing, the thermosetting resin powder being of a particle size equal to or more than 150 μm and a HPF of 80 to 150 mm and a moisture content of 1.0 to 3.0 weight % and Fe, Ni, Si and Ca each equal to or less than 5 ppm;

b) burning a molded body obtained by said hot-molding step to carbonize said molded body; and c) mirror-polishing a burned body obtained by said burning step, wherein the burning step is a step of filling a disk shaped molded body into a graphite cylinder, and heating the graphite cylinder to heat the molded body, thereby burn-carbonizing the molded body, while a condition therefor maintains in that the disk shaped resin molded body is stacked holding a graphite spacer at every sheet basis or at every plurality of sheet basis, and placed on its top with a tungsten carbide weight, the graphite spacer being of a heat conductivity equal to or less than 100 kcal/m.hr.° C. and a bulk-density of 1.70 to 1.85 and a flatness degree equal to or less than 10 μm.

13. A method of manufacturing a carbon substrate according to claim 12, wherein the graphite cylinder and the graphite spacer are of ash equal to or less than 100 ppm, Fe equal to or less than 10 ppm, Ti equal to or less than 5 ppm, and V equal to or less than 5 ppm.

14. A method of manufacturing a carbon substrate comprising the steps of:

a) hot-molding a thermosetting resin powder to be a hard carbon substrate after burn-carbonizing, the thermosetting resin powder being of a particle size equal to or more than 150 μm and a HPF of 80 to 150 mm and a moisture content of 1.0 to 3.0 weight % and Fe, Ni, Si and Ca each equal to or less than 5 ppm;

b) burning a molded body obtained by said hot-molding step to carbonize said molded body; and c) mirror-polishing a burned body obtained by said burning step, wherein between the burning step and the polishing step is provided a hot isostatical pressure step for performing a hot isostatical pressure treatment while the condition therefor is maintained in that a hole provided in the graphite jig is stacked therein with the resin molded body after burn-carbonizing, and loaded further thereon with a carbon end plate, and placed further on its top with a tantalum carbide weight.

15. A method of manufacturing a carbon substrate according to claim 14, wherein the end plate is of a heat conductivity equal to or less than 20 kcal/m.hr.° C.

16. A method of manufacturing a carbon substrate according to claim 14, wherein the tantalum carbide weight is used as a weight in a state of being sealed in a graphite container.

17. A method of manufacturing a carbon substrate according to claim 14, wherein the graphite jig and the carbon end plate are of ash equal to or less than 100 ppm, Fe equal to or less than 10 ppm, Ti equal to or less than 5 ppm, and V equal to or less than 5 ppm.

* * * * *